2 Sheets--Sheet 1.

C. H. FROST.

JOSEPHINE M. FROST & W. A. HUNT, Ex'rs.

Improvement in Stoves.

No. 5,894.

Reissued June 2, 1874.

Witnesses.
J. F. Campbell
J. N. Campbell.

Josephine M. Frost - Executrix
W. A. Hunt - Executor
of
Charles H. Frost - Inventor - deceased.
by
Mason, Fenwick & Lawrence

N. PETERS, PHOTO-LITHOGRAPHER, WASHINGTON, D. C.

2 Sheets--Sheet 2.

C. H. FROST.

JOSEPHINE M. FROST & W. A HUNT, Ex'rs.

Improvement in Stoves.

No. 5,894. Reissued June 2, 1874.

Witnesses:
R. T. Campbell
J. N. Campbell

Josephine M. Frost Executrix
W. A. Hunt Executor
Chas. H. Frost Inventor deceased
by
Mason, Fenwick & Lawrence

N. PETERS, PHOTO-LITHOGRAPHER, WASHINGTON, D. C.

UNITED STATES PATENT OFFICE.

JOSEPHINE M. FROST AND WILLIAM A. HUNT, OF PEEKSKILL, (EXECUTORS OF CHAS. H. FROST, DECEASED,) ASSIGNORS, BY MESNE ASSIGNMENTS, TO JOHN S. PERRY, OF ALBANY, NEW YORK.

IMPROVEMENT IN STOVES.

Specification forming part of Letters Patent No. 67,283, dated July 30, 1867; Reissue No. 5,894, dated June 2, 1874; application filed September 13, 1873.

*To all whom it may concern:*

Be it known that CHARLES H. FROST, deceased, formerly of Peekskill, in the county of Westchester and State of New York, did, in his life-time, invent certain Improvements in Stoves, of which the following is a full, clear, and exact description, reference being had to the accompanying drawings, making part of this specification, in which—

Figure 1:
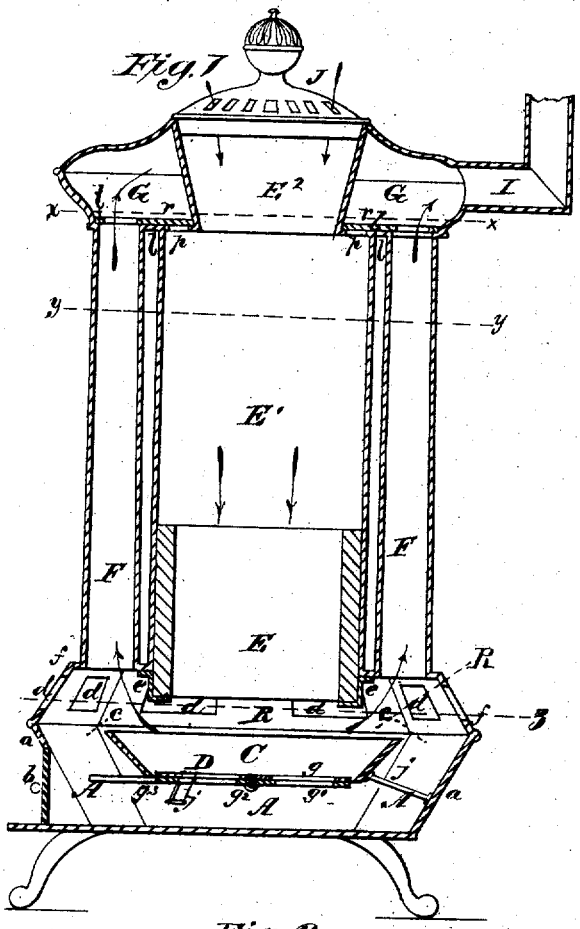
Figure 2:
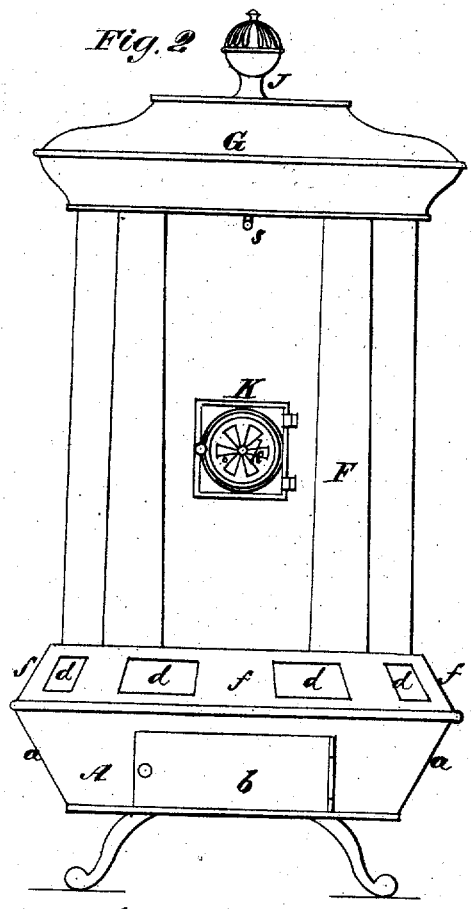
Figure 3:
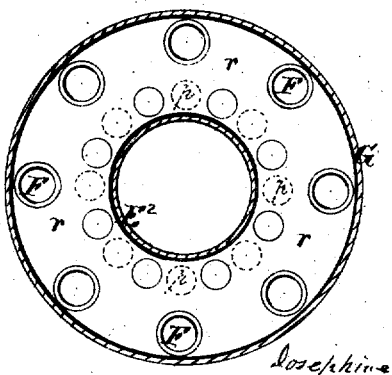
Figure 4:
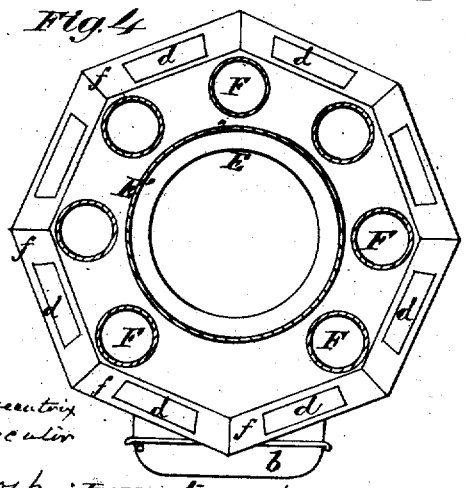
Figure 5:
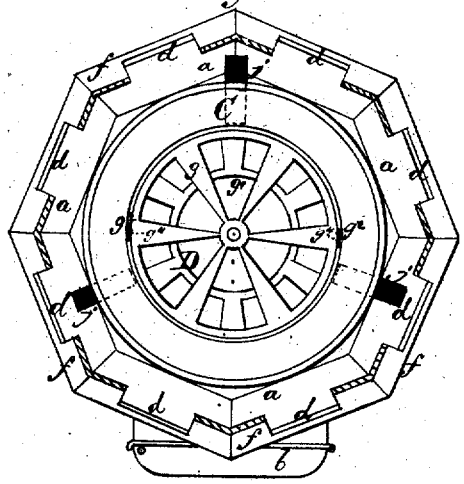
Figure 6:
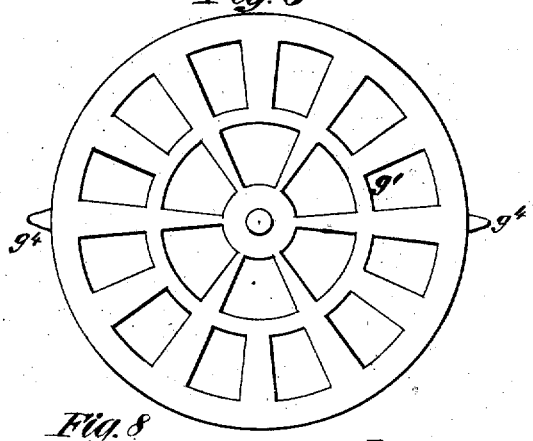
Figure 7:
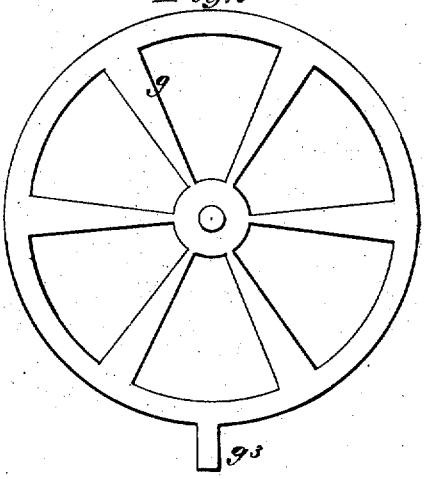
Figure 8:
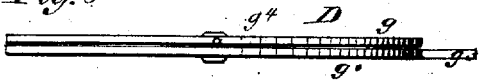

Figure 1, Plate 1, is a section taken vertically and centrally through the improved stove. Fig. 2, Plate 1, is a front view, showing a door applied to the cylinder. Fig. 3, Plate 1, is a section taken in the horizontal plane indicated by dotted lines *x x*, showing the register at the top of the cylinder. Fig. 4, Plate 1, is a section taken in the horizontal plane *y y*. Fig. 5, Plate 2, is a section taken in the horizontal plane *z z*. Figs. 6, 7, and 8, Plate 2, show the construction of the grate or fire-bed.

The nature of this invention consists in constructing a stove embodying the following elements and combinations: First, a hollow base-section, so constructed as to form the draft-chamber, and within which a portion of the fuel is burned in an open free space between the top of the grate or fire-bed and the base of the fire-pot, either upwardly or outwardly, by means of air admitted thereto from below or from above the incandescent fuel through the cylinder; second, a grate or fire-bed placed in a plane below the base of the fire-pot or combustion-chamber proper, so as to form an open free space between the two within the draft-chamber base-section, and isolated from the walls of same; third, a grate or fire-bed of larger diameter or area than the inside diameter or area of the fire-pot or combustion-chamber proper, placed in a plane below the said base and within the exterior walls of the draft-chamber base-section, and isolated from the same; fourth, a grate or fire-bed, having its outer portion flared upward, placed in a plane below the base of the fire-pot or combustion-chamber proper within the draft-chamber base-section, and isolated from the walls of same; fifth, a grate or fire-bed, having its outer portion flared upward, of larger diameter or area than the inside diameter or area of the base of the fire-pot or combustion-chamber proper, placed in a plane below the said base and within the exterior walls of the draft-chamber base-section, and isolated from the same; sixth, a grate or fire-bed, with its central and outer sections made separately, placed in a plane below the base of the fire-pot or combustion-chamber proper within the draft-chamber base-section, and isolated from the walls of same; seventh, a grate or fire-bed, with its central and outer sections made separately, of larger diameter or area than the inside diameter or area of the base of the fire-pot or combustion-chamber proper, placed in a plane below the said base and within the exterior walls of the draft-chamber base-section, and isolated from the same; eighth, a grate or fire-bed, with its central and outer sections made separately, the latter being flared upward, placed in a plane below the base of the fire-pot or combustion-chamber proper within the draft-chamber base-section, and isolated from the walls of same; ninth, a grate or fire-bed with its central and outer sections made separately, the latter being flared upward, of larger diameter or area than the inside diameter or area of the base of the fire-pot or combustion-chamber proper, placed in a plane below said base and within the exterior walls of the draft-chamber base-section, and isolated from the same; tenth, a grate or fire-bed so constructed that its central section may be vibrated horizontally or dumped vertically within the outer section, and placed in a plane below the base of the fire-pot or combustion-chamber proper and within the exterior walls of the draft-chamber base-section, and isolated from the same; eleventh, a grate or fire-bed with its central section made in two perforated sections, one laid upon the other, and connected at their axis in such a manner as to allow them to be moved upon the same independently of each other, and so that both together may be vibrated horizontally or dumped vertically within the outer section, and placed in a plane below the base of the fire-pot or combustion-chamber proper within the draft-chamber base-section, and isolated from the walls of same; twelfth, a grate or fire-bed placed in a plane below the base of a fire-pot or combustion-chamber proper within a draft-chamber base-section of a stove, having upwardly-inclined and downwardly-inclined surfaces of the same, whereby the area of the grate or fire-bed can be enlarged and the free circulating-space between the same and the walls of the said draft-chamber base-section be maintained, thereby increasing the heating power of said base-section by providing within the same an increased surface of ignited fuel without increasing the size of the main body of the said stove; thirteenth, an open free space all around, beneath, and above a grate or fire-bed within the draft-chamber base-section; fourteenth, a draft and flame space between the top surface of a grate or fire-bed and the base of a fire-pot or combustion-chamber proper within the draft-chamber base-section; fifteenth, the combination of a fire-pot or combustion-chamber proper, a grate or fire-bed, and a draft-chamber base-section, whereby the air which promotes combustion circulates freely beneath the said grate or fire-bed, around its periphery, and over its top, within the said draft-chamber base-section, thereby increasing the facility for producing combustion, protecting the grate or fire-bed against the action of the fire, and thus insuring its greater durability; sixteenth, the combination of a fire-pot or combustion-chamber proper which extends partially into the draft-chamber base-section with a grate or fire-bed placed in a plane below the base of said fire-pot or combustion-chamber proper, and isolated from the walls of said draft-chamber base-section; seventeenth, the combination of a fire-pot or combustion-chamber proper which extends partially into the draft-chamber base-section with a grate or fire-bed of larger diameter or area than the inside diameter or area of the base of said fire-pot or combustion-chamber proper, placed in a plane below the said base and within the exterior walls of the said draft-chamber base-section, and isolated from the same; eighteenth, the combination of mica or other transparent windows in the walls of the draft-chamber base-section, a grate or fire-bed placed in a plane below the base of the fire-pot or combustion-chamber proper, the open free space formed between the same, the said grate or fire-bed isolated from the walls of the said draft-chamber base-section, whereby a brilliant illumination is transmitted through the said windows and increased heat radiated through the said walls into the apartment; nineteenth, a grate or fire-bed of larger diameter or area than the inside diameter or area of the base of the fire-pot or combustion-chamber proper, placed in a plane below the said base, combined with the centrally outward-projecting sides of the draft-chamber base-section, by which the draft-passage or combustion-chamber outside the periphery of said grate or fire-bed is enlarged, and also with the open free combustion-chamber around and above the same; twentieth, the combination of mica or other transparent windows in the walls of the draft-chamber base-section, a grate or fire-bed of larger diameter or area than the inside diameter or area of the base of the fire-pot or combustion-chamber proper, and placed in a plane below the said base, the open free space formed between the same, the said grate or fire-bed isolated from the walls of the said draft-chamber base-section, whereby a brilliant illumination is transmitted through the said windows and increased heat radiated through said walls into the apartment; twenty-first, a draft-chamber base-section made in the form of two truncated tapering figures, their bases being joined, in the upper section of which are openings provided with transparent windows, and in the lower a door for the admission of air to the fuel, and for admission to the ash-pit; twenty-second, a fire-pot or combustion-chamber proper, with openings both above and below the same, to admit air for draft below or above the burning fuel, a grate or fire-bed placed in a plane below the base of said fire-pot or combustion-chamber proper, thus forming an open draft or flame space between the two for the passage of the "direct draft" inward and upward, or the "reverse draft" downward and outward, and a hollow draft-chamber base-section, whereby the said fire-pot or combustion-chamber proper may be used either as an ascending or descending passage for the products of combustion to the exit-pipe; twenty-third, a flue or chamber placed over and outside the top of the central cylinder or main body, and communicating with it by means of register-openings, and also with the draft-chamber base-section through other register-openings and pipes extending downward to and connected with same outside the said central cylinder or main body, whereby the draft may be made to ascend or descend through the latter at pleasure.

In the accompanying drawings, in which similar letters refer to similar parts, A is the ash-pit or draft-chamber base-section of the stove, formed by walls *f a*, and within which a portion of the fuel is burned. This base-section is in the form of two truncated tapering figures, joined at their bases, and may be made round or of any desired form. In this example it is made of polygonal form, each side being constructed with a projecting angle, with its largest diameter near its vertical center. This projecting angle, occurring nearly opposite to the periphery of the grate or fire-bed, gives a sufficient space for the passage of air around and over the same, and enlarges the free open combustion-chamber *c* without increasing the size of the whole base-section. The upper section *f* inclines upward and inward toward its horizontal top surface, with which it forms a joint, and in its inclined sides are openings provided with windows of mica or other transparent material. Inclining the sides *f* in this manner subjects them to a more direct action of the fire, the hot products of which sharply impinge against their inner surfaces, and thus produce a more powerful radiation than if placed in a vertical position. The transparent windows in this section *f*, being subjected to the same action of the fire, give like results, with the addition of an illuminating-surface, through which the strong light from the incandescent coal is reflected upward into the room, thus increasing the brilliancy and the cheerful appearance over that which could be obtained from windows placed in a vertical position.

The lower part *a* of the base-section has a door, (shown at *b*,) through which the ashes and other refuse may be removed from the ash-pit A, and also through which air may be admitted direct for promoting combustion when the direct draft is used, or through a register placed in the same for that purpose. The whole of this base-section forms an undivided chamber for the direct or reverse draft of the stove, within which a grate or fire-bed is suspended, upon which combustion of fuel takes place, with illumination from the same through the windows into the apartment.

It will therefore appear that the inclining of the section *a* of the base downward and inward is of great value, for the reason that by this construction the heat is reflected from the burning fuel within the draft-chamber base-section downward and upon the floor of the room, where it is most needed, from whence it will ascend in the usual way.

$E^1$ we denominate the central cylinder or main body of the stove above the brick linings, and forms the combustion-chamber for the gases when the direct draft is used. In its front sides a door, K, may be placed, through which fuel can be supplied, and in which a register may be provided for the admission of air to support combustion when the reverse draft is used.

E we denominate the fire-pot or combustion-chamber proper, and is formed in the lower portion of the central cylinder or main body, and within which a portion of the fuel is burned, while the remaining portion is burned below the same upon the grate or fire-bed within the draft-chamber base-section. This fire-pot extends nearly to the base of the door K, and is lined in the usual mode with fire-brick or other refractory material which will resist the action of the fire, for the purpose of protecting the sides of that portion of the central cylinder or main body from the effect of the same. These brick rest upon angle-irons *e e*, which may be fastened to the lower edge of the central cylinder or main body, or to any other convenient part of the stove; or the brick may be supported in any other suitable manner.

The chamber $E^2$ extends through the flue-passage G to the top of the stove, and is closed by a movable cover, J, through which fuel may be supplied, and in which openings may be provided to admit air for promoting combustion when the reverse draft is used. These openings, as well as this chamber, may be omitted when the door K and register *k* in the same are provided on the side of the central cylinder or main body. This chamber is made tapering downward from the top of the stove to the bottom plate *l* of the flue-passage G, so that a portion of the latter is placed within the line of the inner diameter of the central cylinder or main body, thus providing an annular flue-space in the base of the flue-passage G around the said chamber within the inner diameter of the said central cylinder or main body.

In the top of the stove, and occupying the entire space outside the chamber $E^2$, is the flue-passage G and the exit-flue I, leading out of the same.

Through the bottom plate *l* of the flue-passage G are openings *p* within the inner diameter of this central cylinder or main body, so that direct communication may be had between it and the flue-passage G.

In the bottom plate *l* of the flue-passage G are a series of openings, *p*, within the line of this central cylinder or main body, for the purpose of forming a communication between the latter, the flue-passage G, and the exit-pipe I, when the direct draft is used. Another series of openings is also provided in this plate *l*, outside and around the line of the said central cylinder or main body, through which an indirect draft may be established from the draft-chamber base-section A through the flues F, which are arranged in circular order around the said central cylinder or main body, and corresponding and connected with the said second series of openings, as shown in drawings, Figs. 3 and 4, Plate 1.

An annular register-plate, *r*, rests upon the said bottom plate *l* of the said flue-passage G, and may be moved upon the same at pleasure by a handle, *s*, which projects downward from said register, through the said plate in front and outside of the said cylinder or main body. On the other hand, when the register *r* is so placed that the openings *p* are closed and those communicating with the flues F are opened, a reverse draft is established through the openings in top cover J or in the door K, descending through the central cylinder or main body and the fuel in the fire-pot or combustion-chamber proper, E, through the open free space R between the top of the grate and the base of the said fire-pot or combustion chamber proper, into the draft-chamber base-section A, and thence upward through the flues F to the flue-passage G and to the exit-pipe I, thus consuming a large portion of the inflammable gases which would otherwise escape unburned.

The interior of the base A forms a single chamber, in which is suspended, by bars or brackets or other convenient devices, a grate, C D, whose sides flare outward a little distance beyond the line of the inner circumference of cylinder E. D C is the grate or fire-bed, made in two sections, each of which is of larger area than the inside of the fire-pot or combustion-chamber proper, and placed, in a plane below the base of same, within the draft-chamber base-section, and isolated from its outer walls. C is the flaring, and D the horizontal, section. The former is supported upon bars or brackets *j* attached to the outer walls of the draft-chamber base-section, or in any other mode that may be convenient. The latter is provided with projecting lugs, placed upon opposite sides of the same, a little distance back of its largest diameter, which rest in socket-bearings formed at the base of the flaring sides.

If preferred, a bar, $g^2$, extending across beneath the latter, may be substituted for said lugs, or other convenient devices may be adopted.

The horizontal section is formed of two parts, $g$ $g^1$, (shown in detail, Plate 2, Figs. 6, 7, and 8,) one laid upon the other, their centers being connected by a pivot, or in any other convenient manner, to allow them to be vibrated upon their axis independently of each other.

When the upper part is constructed to be turned, the lower part remains stationary, and vice versa. The extent of the movement of either is determined by a pin, which extends downward or upward, as the case may be, from one of the radial bars, and comes against the adjacent bars of the stationary part. When the bars of the movable part are brought over to coincide with those in the stationary part, large openings are formed between these radial bars. When the former are brought to a central position between the bars of the latter, a horizontal grate-surface of ordinary construction is produced.

When it is desired to clean the grate or fire-bed of ashes and other refuse matter, the loose part is vibrated laterally, when the bars of the two parts $g$ $g^1$ will operate like shears, and cut in two or break clinkers which may be caught between adjacent bars, and thus clear themselves of any refuse substances. When the horizontal section of the grate or fire-bed is to be dumped, both these parts are turned down together upon the lugs $g^4$ or cross-bar $g^2$, as the case may be.

In a stove constructed with the grate or fire-bed placed in a plane below the base of the fire-pot or combustion-chamber proper, forming the free open space R between the same, it is unnecessary ever to dump the grate, as the coals can be readily shaken down through the said space from the surface of the grate D C into the ash-pit A without inconvenience from the dust which results from dumping the whole contents of the fire-pot or combustion-chamber proper in one mass into the ash-pit, from which more or less of it falls out upon the floor when the doors are opened.

To vibrate or dump the grate or fire-bed, insert a shaker-bar, through the door *b* or other opening provided in the draft-chamber base-section, into the socket $g^3$ formed on the front side of the grate.

The same principle of construction—that is, two grated plates placed together, one of which is movable and the other stationary—may be applied to the flaring sections C of the grate or fire-bed. This section may be formed in bars, connected or disconnected at their upper ends, the oblique or vertical length of same being regulated at pleasure.

The flaring sides prevent the unburned coal from falling into the ash-pit, and this form gives facility for enlarging with safety the open free space between the surface of the grate or fire-bed and the base of the fire-pot or combustion-chamber proper.

This fire-pot or combustion-chamber proper, E, and this grate or fire-bed D C are independent of each other, the latter being isolated or separated from the base of the former, and also from the exterior walls of the draft-chamber base-section.

By placing the grate or fire-bed D C in a plane below the base of the fire-pot or combustion-chamber proper, E, an open, unobstructed, free space, R, is formed between the two, and a free communication made with the draft-chamber base-section.

The plane of the grate or fire-bed D C is enlarged beyond the inside diameter or opening of the fire-pot or combustion-chamber proper, E, and the more this is enlarged the wider can be the free open space between the two, thus increasing to the same extent the unobstructed surface of the incandescent coal for illuminating through the windows in the plate *f*, and the amount of oxygen that can be thrown into the fire-pot or combustion-chamber proper, a more economical and perfect combustion of the fuel, as well as a more rapid combustion when required.

By flaring the sides *f a* of the draft-chamber base-section, as described, and shown in Figs. 1 and 2, Plate 1, the grate or fire-bed D C may be thus enlarged without diminishing the flue-space surrounding the same, as shown at *c*, Fig. 1, Plate 1.

This enlarged grate or fire-bed, so placed relatively to the said flaring sides *f a* and to transparent windows *d* in the section *f*, causes the heat from the incandescent fuel upon said grate or fire-bed, and also that portion exposed in the clear open space R, as well as the inflamed gases in the combustion-chamber *c*, to impinge with great power upon their exterior flaring plates, thus effectually heating the base of the room, and also brilliantly illuminating the whole apartment.

When a fire is to be kindled in the stove, the openings in the cover J, or in the door K, whichever may be in use, must be closed, and the handle *s* placed so that the register *r* will close the top of the flues F and open the apertures *p* in the bottom plate *l* of the flue-passage G.

Fuel is supplied to the fire-pot or combustion-chamber proper, E, through the cover J or door K, and the draft admitted to promote combustion through the door *d* or register-openings formed in same. In this case the products of combustion pass upward from the grate or fire-bed D C and the fire-pot or combustion-chamber proper, E, through the combustion-chamber E[1] and openings *p*, into the flue-passage G, and thence to the exit-pipe I, thus operating substantially like an ordinary cylinder "surface-burning" stove.

When it is desired to more perfectly consume the gases and to more thoroughly heat the floor, the handle *s* will be moved to the other side, thus closing the openings *p* and opening the top of flues F. The draft-openings below the grate or fire-bed must be closed, and those above the fuel in door K or cover J, as the case may be, opened. The draft being thus reversed, the products of combustion are carried downward through the burning fuel in the fire-pot or combustion-chamber proper, E, and over that upon the grate or fire-bed D C into the free open combustion-chamber *c*, and thence upward through the flues F and the flue-passage G into the exit-pipe I.

The base-section, being an undivided draft-chamber, receives against its surfaces *f a* and mica windows *d* the full power of the incandescent fuel and its burning gases in the combustion-space *c*, and thus becomes like an intensely-heated drum, thoroughly warming the base of the apartment. It will therefore appear that by simply changing the position of register *r* and the registers in the doors a direct or indirect draft may be established.

The central cylinder or combustion-chamber E[1], when the draft is direct, becomes an ascending chamber for the smoke and gases, and when the draft is indirect a descending channel for the supply of air to the fire-pot or combustion-chamber proper, E, and in either case the grate or fire-bed D C performs the same relative functions in the draft-chamber base-section.

Having thus described the invention of the said CHARLES H. FROST, what we claim as new with him, and desire to secure by Letters Patent, is—

1. A hollow-base section forming the draft-chamber, and within which a portion of the fuel is burned in an open free space between the top of the grate and the base of the fire-pot, either upwardly or outwardly, by means of air admitted thereto from below or from above the incandescent fuel through the cylinder, substantially as shown and described.

2. A grate or fire-bed, with or without its outer walls flaring upward, placed in a plane below the base of the fire-pot or combustion-chamber proper, so as to form an open free space between the two within the draft-chamber base-section, and isolated from the walls of same, substantially as shown and described.

3. A grate or fire-bed, with or without its outer walls flaring upward, of larger diameter or area than the inside diameter or area of the base of the fire-pot or combustion-chamber proper, placed in a plane below the said base and within the exterior walls of the draft-chamber base-section, and isolated from the same, substantially as shown and described.

4. A grate or fire-bed with its central and outer sections made separately, and placed in a plane below the base of the fire-pot or combustion-chamber proper within the draft-chamber base-section, and isolated from the walls of the same, substantially as shown and described.

5. A grate or fire-bed with its central and outer sections made separately, and so constructed that the former may be vibrated horizontally or dumped vertically within the latter, the whole being of a larger diameter or area than the inside diameter or area of the base of the fire-pot or combustion-chamber proper, and placed in a plane below the base of the latter, within the exterior walls of the draft-chamber base-section, and isolated from the same, substantially as shown and described.

6. A grate or fire-bed with its central section made in two perforated sections, one laid upon the other, and connected at their axis in such a manner as to allow their being moved upon the same independently of each other, and so that both together may be vibrated horizontally or dumped vertically within an outer section, the whole being of a larger diameter or area than the inside diameter or area of the base of the fire-pot or combustion-chamber proper, and placed in a plane below the base of the latter within the draft-chamber base-section, and isolated from the walls of same, substantially as shown and described.

7. A grate or fire-bed placed in a plane below the base of a fire-pot or combustion-chamber proper within a draft-chamber base-section, having upwardly-inclined and downwardly-inclined surfaces, whereby the area of the grate or fire-bed can be enlarged and the free circulating-space between the same and the walls of the said draft-chamber base-section be maintained without increasing the size of the top and bottom plates of said draft-chamber base-section, substantially as shown and described.

8. The combination of a grate or fire-bed of larger diameter or area than the inside diameter or area of the base of the fire-pot or combustion-chamber proper, the free open space between the two, with the windows of mica or other transparent material in the walls of the draft-chamber base-section, substantially as described.

9. A draft and flame space between the top surface of a grate or fire-bed and the base of a fire-pot or combustion-chamber proper within the draft-chamber base-section, substantially as shown and described.

10. The combination of a fire-pot or combustion-chamber proper, which extends down partially into the draft-chamber base-section, with a grate or fire-bed placed in a plane below the base of said fire-pot or combustion-chamber proper, and isolated from the walls of said draft-chamber base-section, substantially as shown and described.

11. The combination of mica or other transparent windows in the walls of the draft-chamber base-section, a grate or fire-bed placed in a plane below the base of the fire-pot or combustion-chamber proper, the free open space formed between the same, and the said grate or fire-bed isolated from the walls of the said draft-chamber base-section, substantially as shown and described.

12. A grate or fire-bed of larger diameter or area than the inside diameter or area of the base of the fire-pot or combustion-chamber proper, placed in a plane below the said base, combined with centrally outward-projecting sides of the draft-chamber base-section, substantially as shown and described.

13. A draft-chamber base-section made in the form of two truncated tapering figures, their bases being joined, the upper section being provided with mica or other transparent windows, substantially as shown and described.

14. The combination of a fire-pot or combustion-chamber proper, a grate or fire-bed placed in a plane below the base of same, a free open space between the two, a hollow draft-chamber base-section, a draft opening into the same under the said grate or fire-bed, and a draft opening into the cylinder or main body above the fuel, substantially as shown and described.

15. The combination of the combustion-chamber $E^1$, the fire-pot or combustion-chamber proper, E, the grate or fire-bed D C, placed in a plane below the base of same, the draft-chamber base-section A, the flues F, flue-passage G, the openings P in base of same, and the register *r*, whereby the draft may be made to ascend or descend at pleasure through the central cylinder or main body, substantially as shown and described.

JOSEPHINE M. FROST,
*Executrix.*
WILLIAM A. HUNT,
*Executor.*

Witnesses:
EUGENE B. TRAVIS,
ROBERT Z. LIDDLE.